(12) United States Patent
Tardieu (10) Patent No.: US 8,894,302 B2
(45) Date of Patent: Nov. 25, 2014

(54) ELEVATED SYSTEMS FOR CAPTURING IMAGES

(76) Inventor: Bert Gerard Tardieu, Salinas, CA (US)

( * ) Notice: Subject to any disclaimer, the term of this patent is extended or adjusted under 35 U.S.C. 154(b) by 96 days.

(21) Appl. No.: 13/418,162

(22) Filed: Mar. 12, 2012

(65) Prior Publication Data

US 2013/0236167 A1   Sep. 12, 2013

(51) Int. Cl.
*E04G 3/00*   (2006.01)
*G03B 17/56*   (2006.01)

(52) U.S. Cl.
USPC ........................................ 396/428; 248/187.1

(58) Field of Classification Search
CPC ...................................................... B60R 11/04
USPC .............................................................. 396/428
See application file for complete search history.

(56) References Cited

U.S. PATENT DOCUMENTS

| | | | |
|---|---|---|---|
| 3,195,234 A * | 7/1965 | Glidden et al. ................. | 33/293 |
| 4,717,251 A | 1/1988 | Wells et al. | |
| 5,360,196 A | 11/1994 | DiGiulio et al. | |
| 5,435,515 A | 7/1995 | DiGiulio et al. | |
| 5,735,497 A | 4/1998 | Haas et al. | |
| 5,749,549 A * | 5/1998 | Ashjaee ........................ | 248/168 |
| 6,789,557 B1 * | 9/2004 | Wahl, Jr. ....................... | 135/154 |
| D540,414 S | 4/2007 | Glenn | |
| 7,984,910 B1 | 7/2011 | Nielsen | |
| 8,291,923 B2 * | 10/2012 | Young et al. ................. | 135/20.1 |
| 8,528,868 B2 * | 9/2013 | Leung ......................... | 248/125.8 |
| 2003/0161622 A1 * | 8/2003 | Zantos .......................... | 396/419 |
| 2005/0212243 A1 * | 9/2005 | Terry ......................... | 280/79.11 |
| 2006/0007303 A1 * | 1/2006 | Milton ............................ | 348/77 |
| 2009/0261642 A1 * | 10/2009 | Dickie .......................... | 297/314 |
| 2010/0238345 A1 | 9/2010 | Greb et al. | |
| 2011/0006174 A1 * | 1/2011 | Hollinger .................... | 248/176.1 |
| 2011/0008037 A1 * | 1/2011 | Viggiano et al. .............. | 396/428 |
| 2011/0052178 A1 * | 3/2011 | Sweeney et al. .............. | 396/420 |
| 2011/0303256 A1 * | 12/2011 | Ashley .......................... | 135/117 |

OTHER PUBLICATIONS

GeoData, Systems Management Inc., "Portable TeleScoping Pole Tripod System with Gimbal," Copyright © 2011, (5 pgs.).
SkyMast30™ Tripod Mounted System, SkyMast 30™ Videography Equipment, Copyright © 2010, (4 pgs.).
Telescopic Mast Photography System, Elevated-Photography™, Copyright © 2008, Giraffecam™, (14 pgs.).

(Continued)

*Primary Examiner* — Clayton E Laballe
*Assistant Examiner* — Linda B Smith
(74) *Attorney, Agent, or Firm* — Blakely, Sokoloff, Taylor & Zafman LLP (57) ABSTRACT

Described herein is an elevated system that can be used for various purposes including capturing images or video at an elevated height. In one embodiment, the elevated system includes support members and a mechanism (e.g., gimbal, pivot) that is coupled to at least one support member. The mechanism provides a range of motion along independent axes. An elongated member is coupled to the mechanism. The mechanism is capable of providing movement of the elongated member with a range of motion of three hundred and sixty degrees.

17 Claims, 13 Drawing Sheets

(56) References Cited

OTHER PUBLICATIONS

U.S. Sports Video Endzone Camera Systems (EagleCam *SkyHawk* & Raven), see: http://www.ussportsvideo.net/products.html?TB_LINK=table_3fbbf092a8a9c (2 pgs.).

Hi-Pod, COREX7: X7 (Extended and compressed), Oct. 20, 2011, (4 pgs.).

Steadicam Pilot, The Tiffen Company, Tiffen-Steadicam, www.tiffen.com (covered by U.S. Patents 5,435,515 and 5,360,196) (no date available) (2 pgs.).

"Lens height and the telescoping post: Just how high or low a lens height can you get?" http://www.steadicam.com/images/content/U2_LensHeight.pdf, pp. 44-47 (4 pgs.).

Blackbird, Camera Stage, "Tripod Adaptor," Copyright © 2011, Camera Motion Research http://www.cathayphoto.com.sg/node/631 (6 pgs.).

Film Equipment for Lovely Film Making, www.dvcity.com, "22ft Jib Arm camera crane+150mm Bowl Stand for video film making camera," Oct. 5, 2011, (12 pgs.).

Film Equipment for Lovely Film Making, www.dvcity.com, "Production Package-1000 14' Jib Crane+Sr. Pan Tilt Head+Track Dolly," Copyright © 2005-2011(20 pgs.).

News Expo, Advanced Search, "JIB," Cartoni Jib—the jib interfaces with any 100mm bowl base tripod, Copyright © 2011, (3 pgs.).

* cited by examiner

ELEVATED SYSTEMS FOR CAPTURING IMAGES

TECHNICAL FIELD

Embodiments of the present invention relate to elevated systems for capturing images.

BACKGROUND

Image-capturing devices include cameras, portable handheld electronic devices, video recorders, and other electronic devices. The images and video captured by image-capturing devices may be compromised in certain environments such as sporting events, outdoor events, etc. based on factors such as people, obstructions, moving objects, and windy conditions.

Prior approaches use an elevated video tripod for recording video at an elevated height. These approaches may not be stable in windy conditions, may not be suitable for indoor conditions, or may be difficult to assemble and use.

BRIEF DESCRIPTION OF THE DRAWINGS

The present invention is illustrated by way of example, and not by way of limitation, in the figures of the accompanying drawings and in which.

DETAILED DESCRIPTION

Described herein is a system that can be used for various purposes including capturing images and video, surveillance, etc. at an elevated height. In one embodiment, the system includes support members and a gimbal mechanism that is coupled to at least one support member. The gimbal mechanism provides a range of motion along independent axes. An elongated member is coupled to the gimbal mechanism. The gimbal mechanism is capable of providing movement of the elongated member with a range of motion of three hundred and sixty degrees. The elongated member may support an image capturing device to capture images at an elevated height (e.g., 5-40 feet above a reference) for indoor or outdoor weather conditions.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
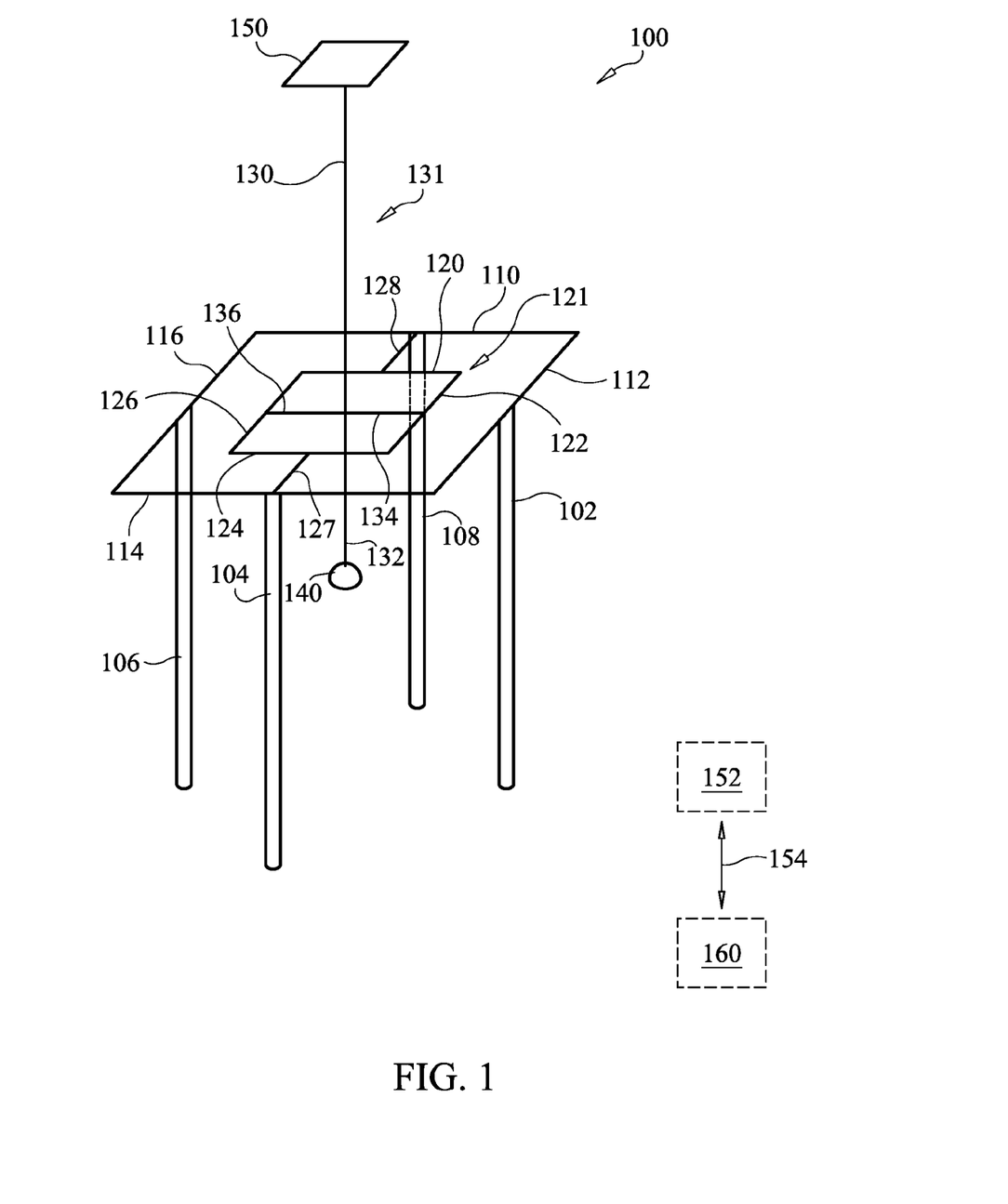
FIG. 1 illustrates a system having a gimbal mechanism in accordance with one embodiment.

FIG. 1 illustrates a system having a gimbal mechanism in accordance with one embodiment. The system may be used for capturing images or sequences of images (e.g., photos, digital stills, video) at an elevated height (e.g., 5-40 feet above a ground reference). The system 100 includes a first set of support members 102, 104, 106, 108 and a second set of support members 110, 112, 114, and 116. The first set of members may include four substantially vertical members that can rest on any relatively flat surface such as the ground, a floor, or even on uneven surfaces such as a platform, bleachers, etc for when one or more of the support members 102, 104, 106, and 108 are reduced in length. The second set of members may include four substantially horizontal members that are coupled to each other when the system is in an assembled condition. Each support member of the first set may be coupled to a corresponding support member of the second set. Additional or fewer support members (e.g., elongated members, curved members, circular members, etc.) may be needed for supporting the gimbal mechanism 121 that is coupled to at least one support member and an extendable or elongated member 131 that is coupled to the gimbal mechanism. The member 131 may include one or more members such as an upper member 130 and a lower member 132. The lower and upper members may be part of a single member that has multiple extendable members similar to a telescope. The lower member 132 or lower region of the member 131 may move substantially within a region formed by the support members. The upper member 130 or an upper region of the member 131 may also move substantially within a region formed by the support members. In this manner, the system 100 only needs a small amount of space that is similar to the dimensions of the support members in order to provide an elevated height for capturing images. The support members are stable and resistant to many forces such as those typically encountered at a sporting event (e.g., basketball, baseball, football, volleyball, etc.) or outside even with windy or rainy weather conditions. The support members and components of the system may include plastic or metallic materials depending on a particular application. The system 100 can be easily assembled as illustrated in FIG. 1 or disassembled into components that can be stored in a small compact area.

The extendable member may be extended to provide two or more lengths. In one embodiment, the extendable member 131 is coupled to a base 150 that can support an optional image capturing device 152 to capture images at an elevated height. The image capturing device 152 may be coupled wirelessly or with wires to an optional controller 160 that controls operations of the image capturing device 152. In an embodiment, the controller 160 includes a display and control options. The controller 160 is communicatively coupled to the image capturing device that can be attached, coupled, or located on the base 150 of the system. The wired or wireless connection 154 allows the controller to control operations of the image capturing device such as pan, tilt, camera zoom, etc.

The gimbal mechanism 121 includes members 120, 122, 124, 126-128, 134, and 136. The gimbal mechanism is capable of providing movement of the extendable member and the image capturing device along a first axis and a second axis. The gimbal mechanism (e.g., members 127 and 128) may be coupled to at least two support members (e.g., 114 and 110) of the second set of support members as illustrated in FIG. 1. Other members (e.g., 126, 122) of the gimbal mechanism may be coupled to the extendable member 131 via members 134 and 136. In an embodiment, the extendable member 131 is replaced with an elongated member having a fixed length.

A counterweight 140 (e.g., 5-30 pounds) can be attached to one end of the extendable member and the counterweight provides a self-righting force to the extendable member that tends to move the extendable member towards a vertical position with respect to a horizontal ground reference.

In one embodiment, an elevated image capturing system includes support members, a gimbal mechanism coupled to at least one support member, an elongated member being coupled to the gimbal mechanism, and an image capturing device coupled to the elongated member such that the gimbal mechanism is capable of providing movement of the elongated member and the image capturing device along a first axis and a second axis. The support members may include a first set of members (e.g., 102, 104, 106, 108) that include at least three substantially vertical members when the system is in an assembled condition. The support members may include a second set of members (e.g., 120, 122, 124, 126) that include at least three substantially horizontal members that are coupled to each other when the system is in an assembled condition. Each support member of the first set may be coupled to a corresponding support member of the second set. The gimbal mechanism may be coupled to at least two support members of the second set of support members. The system may include a counterweight attached to one end of the elongated member to provide a self-righting force to the elongated member.

Figure 2A:
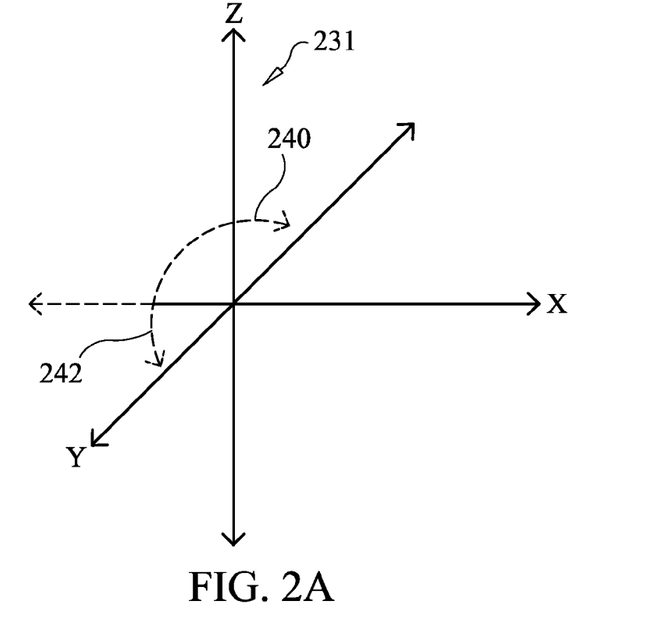
FIG. 2a illustrates movement of an extendable member along a first axis (e.g., y-axis) in accordance with one embodiment.

FIG. 2a illustrates movement of an extendable member along a first axis (e.g., y-axis) in accordance with one embodiment. The extendable member 231 may lie along the z-axis and this member 231 can be moved in the direction 240 or 242 along the y-axis. The members 136 and 134 of FIG. 1 may lie along the x-axis.

Figure 2B:
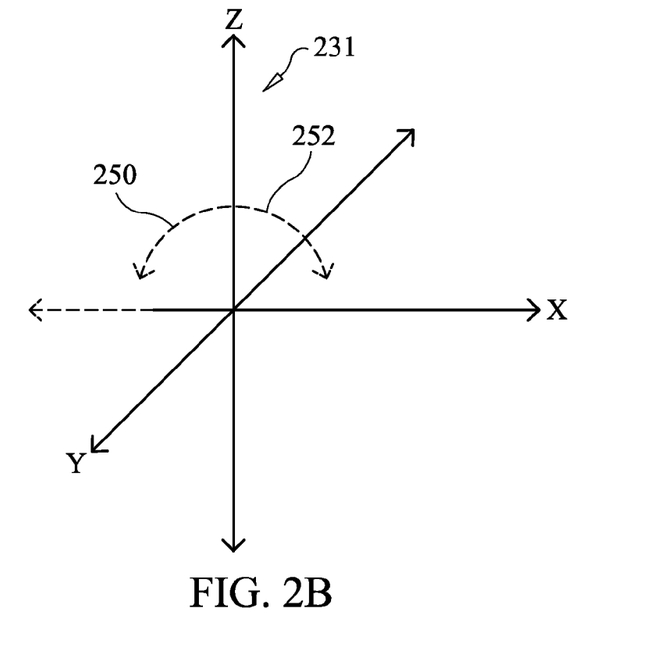
FIG. 2b illustrates movement of an extendable member along a second axis (e.g., x-axis) in accordance with one embodiment.

FIG. 2b illustrates movement of an extendable member along a second axis (e.g., x-axis) in accordance with one embodiment. The extendable member 231 may lie along the z-axis and this member 231 can be moved in the direction 250 or 252 along the x-axis. The members 136 and 134 of FIG. 1 may lie along the x-axis. The first axis (e.g., y-axis) is perpendicular to the second axis (e.g., x-axis) such that the gimbal mechanism provides a range of motion of three hundred and sixty degrees for capturing images in any direction.

Figure 3:
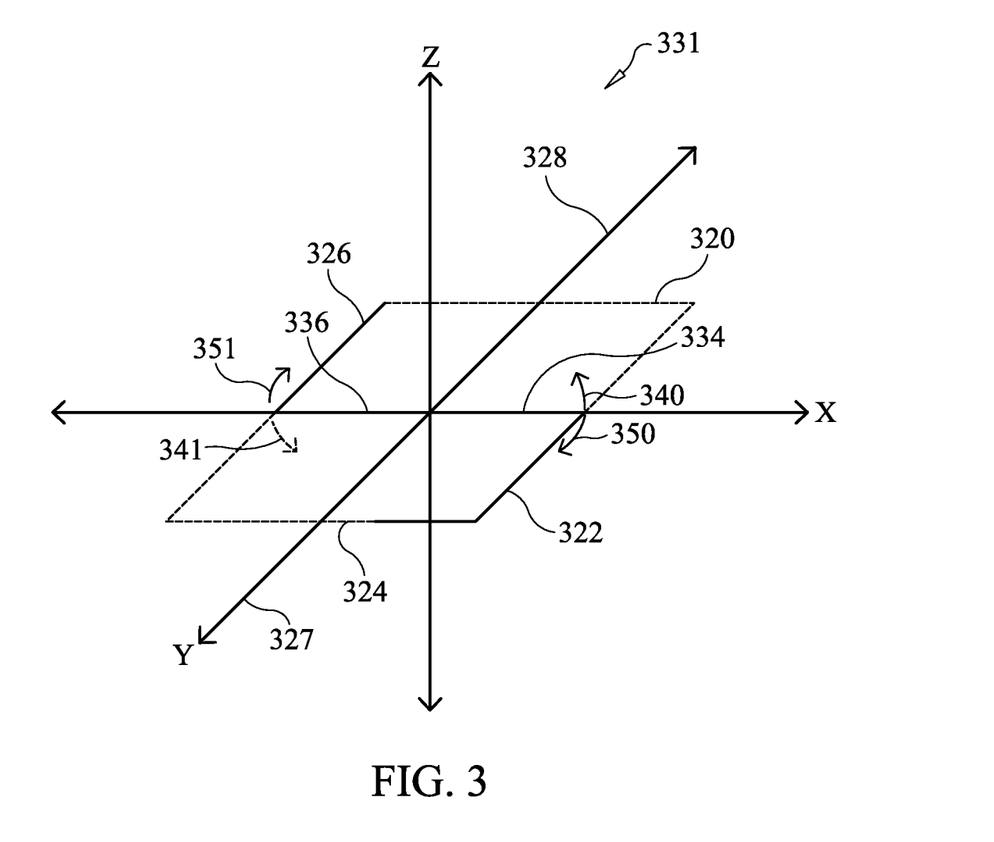
FIG. 3 illustrates movement of members of a gimbal mechanism in accordance with one embodiment.

FIG. 3 illustrates movement of members of a gimbal mechanism in accordance with one embodiment. The gimbal mechanism 331 includes members 320, 322, 324, and 326. These members may correspond to the members 120, 122, 124, and 126 of FIG. 1. The members 320, 322, 324, and 326 are coupled to each other and collectively rotate in directions 340 and 341 or in directions 350 and 351.

Figure 4:
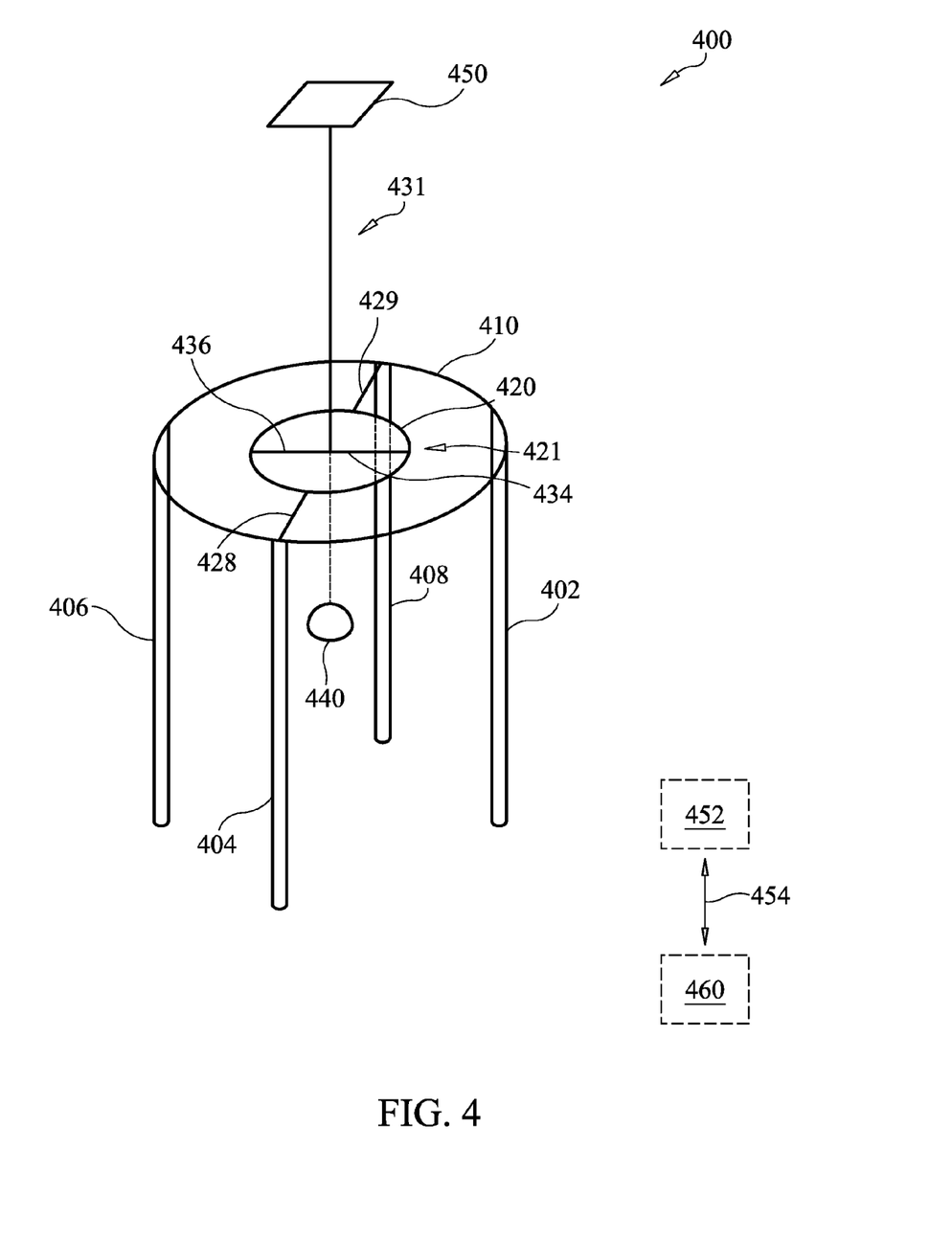
FIG. 4 illustrates a system having a gimbal mechanism in accordance with another embodiment.

FIG. 4 illustrates a system having a gimbal mechanism in accordance with another embodiment. The system may be used for capturing images or sequences of images (e.g., photos, digital stills, video) at an elevated height (e.g., 5-40 feet with respect to a reference). The system 400 includes members and components that are similar to the members and components of the system 100, except that the gimbal mechanism 121 has been replaced with a gimbal mechanism 421 that has curvature (e.g., circular, elliptical). A set of support members 402, 404, 406, 408 and 410 support the gimbal mechanism 421 and the elongated member 431. The support members may include four substantially vertical members when the system is in an assembled condition that can rest on any relatively flat surface such as the ground, a floor, or even on uneven surfaces such as a platform, bleachers, etc. Additional or fewer support members (e.g., elongated members, curved members, circular members, etc.) may be needed for supporting the gimbal mechanism 421 that is coupled to at least one support member (e.g., 410) and an extendable or elongated member 431 that is coupled to the gimbal mechanism. A lower region of the member 431 that is below the member 410 may move substantially within a region formed by the support members. An upper region of the member 431 that is above the member 410 may also move substantially within a region formed by the support members. In this manner, the system 400 only needs a small amount of space that is similar to the dimensions of the support members in order to provide an elevated height for capturing images. The support members are stable and resistant to many forces such as those typically encountered at a sporting event (e.g., basketball, baseball, football, volleyball, etc.) or outside even with windy or rainy weather conditions. The system 400 can be easily assembled as illustrated in FIG. 4 or disassembled into a small compact area.

In one embodiment, the elongated or extendable member 431 is coupled to a base 450 that can support an optional image capturing device 452 to capture images at an elevated height. The image capturing device 452 may be coupled wirelessly or with wires to an optional controller 460 that controls operations of the image capturing device 452. In an embodiment, the controller 460 includes a display and control options. The controller 460 is communicatively coupled to the image capturing device that can be attached, coupled, or located on the base 450 of the system. The wired or wireless connection 454 allows the controller to control operations of the image capturing device such as pan, tilt, camera zoom, etc.

The gimbal mechanism 421 includes members 420, 428, 429, 434, and 436. The gimbal mechanism is capable of providing movement of the extendable member and the image capturing device along a first axis and a second axis. A counterweight 440 (e.g., 5-20 pounds) can be attached to one end of the extendable member and the counterweight provides a self-righting force to the extendable member that tends to move the extendable member towards a vertical position with respect to a horizontal ground reference.

Figure 5:
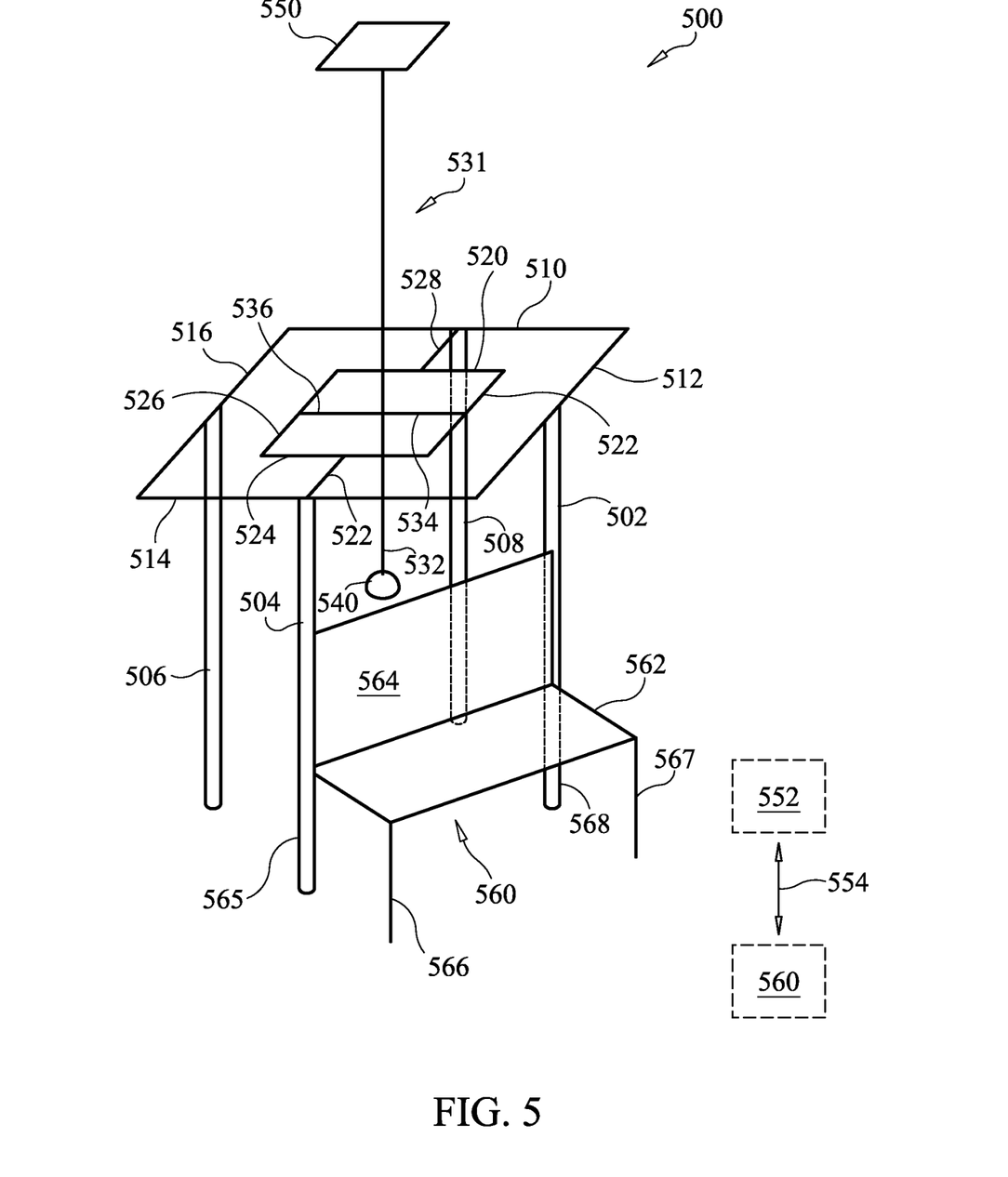
FIG. 5 illustrates a system having a gimbal mechanism that is coupled to a chair in accordance with one embodiment.

FIG. 5 illustrates a system having a gimbal mechanism that is coupled to a chair in accordance with one embodiment. The system may be used for capturing images or sequences of images (e.g., photos, digital stills, video) at an elevated height (e.g., 5-40 feet with respect to a reference). The system 500 includes members and components that are similar to the members and components of the system 100, except that the system 500 is supported partially by a chair 560 or another separate support mechanism (e.g., platform, bleacher). The system 500 includes a first set of support members 502, 504, 506, 508 and a second set of support members 510, 512, 514, and 516. The first set of members may include four substantially vertical members when the system is in an assembled condition that can rest on any relatively flat surface such as the ground, a floor, or even on uneven surfaces such as a platform, bleachers, etc. The second set of members may include four substantially horizontal members that are coupled to each other when the system is in an assembled condition. The lower member or lower region and also upper member or upper region of the member 531 may move substantially within a region formed by the support members. In this manner, the system 500 only needs a small amount of space that is similar to the dimensions of the support members in order to provide an elevated height for capturing images. The support members are stable and resistant to many forces such as those typically encountered at a sporting event (e.g., basketball, baseball, football, volleyball, etc.) or outside even with windy or rainy weather conditions.

In one embodiment, the members 504 and 502 are coupled or attached to the chair 560. The chair includes a back 564, a seat 562, and legs 565-568. The legs 565 and 568 of the chair may be attached inside, outside, or coincidently with the members 504 and 502. Alternatively, the members 504 and 502 may be reduced in length to rest on top of the chair or reduced in length to attach to the chair back or legs.

The extendable member may be extended to provide two or more lengths. In one embodiment, the extendable member 531 is coupled to a base 550 that can support an optional image capturing device 552 to capture images at an elevated height. The image capturing device 552 may be coupled wirelessly or with wires to an optional controller 560 that controls operations of the image capturing device 552. In an embodiment, the controller 560 includes a display and control options. The controller 560 is communicatively coupled to the image capturing device that can be attached, coupled, or located on the base 550 of the system. The wired or wireless connection 554 allows the controller to control operations of the image capturing device such as pan, tilt, camera zoom, etc.

The gimbal mechanism 521 includes members 520, 522, 524, 526-528, 534, and 536. The gimbal mechanism is capable of providing movement of the extendable member and the image capturing device along a first axis and a second axis. A counterweight 540 (e.g., 5-20 pounds) can be attached to one end of the extendable member and the counterweight provides a self-righting force to the extendable member that tends to move the extendable member towards a vertical position with respect to a horizontal ground reference.

Figure 6:
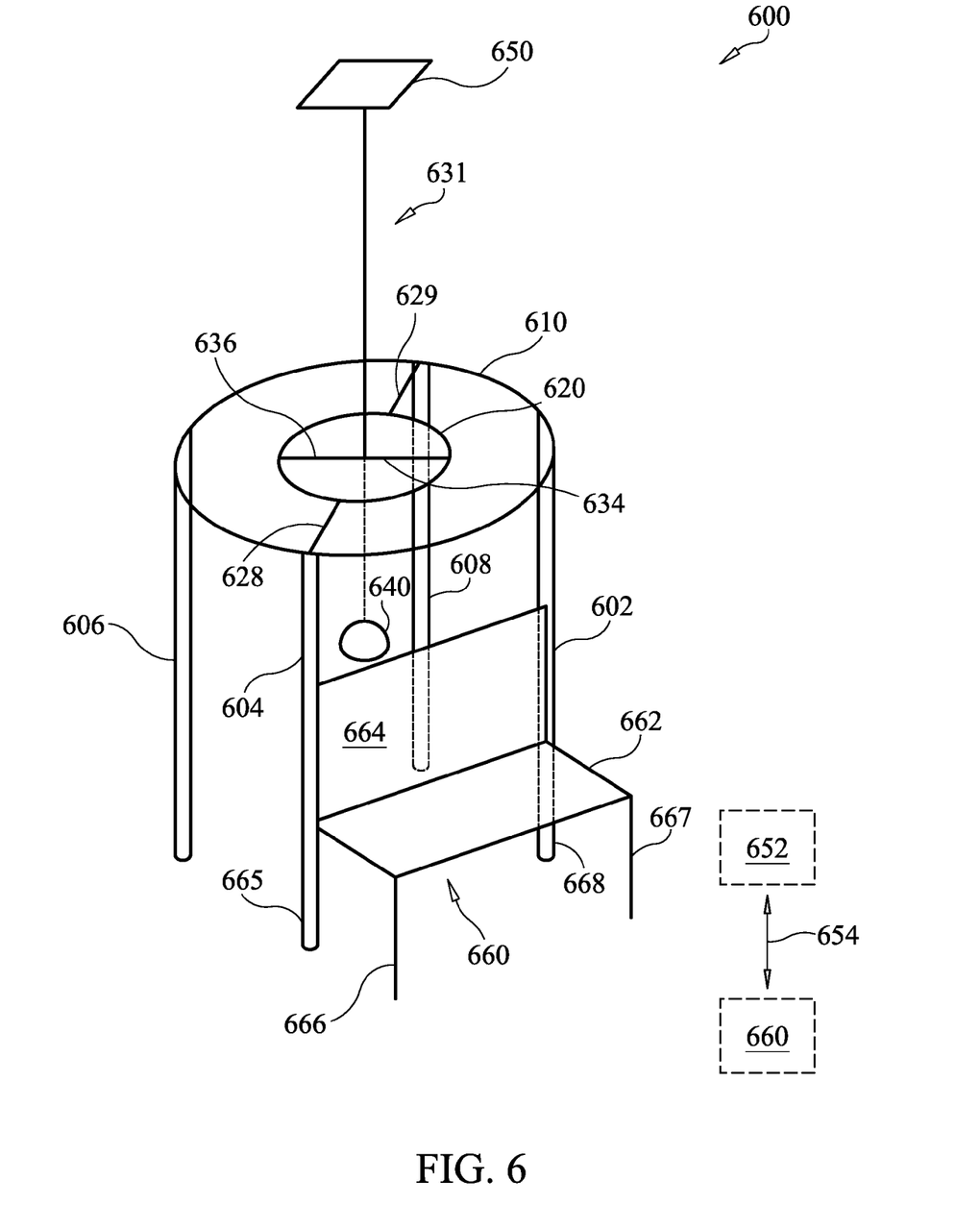
FIG. 6 illustrates a system having a gimbal mechanism that is coupled to a chair in accordance with another embodiment.

FIG. 6 illustrates a system having a gimbal mechanism that is coupled to a chair in accordance with another embodiment. The system may be used for capturing images or sequences of images (e.g., photos, digital stills, video) at an elevated height (e.g., 5-40 feet with respect to a reference). The system 600 includes members and components that are similar to the members and components of the system 400, except that the system 600 is supported partially by a chair 660 or another separate support mechanism (e.g., platform, bleacher). A set of support members 602, 604, 606, 608 and 610 support the gimbal mechanism 621 and the elongated member 631. The support members may include four substantially vertical members when the system is in an assembled condition that can rest on any relatively flat surface such as the ground, a floor, or even on uneven surfaces such as a platform, bleachers, etc. Additional or fewer support members (e.g., elongated members, curved members, circular members, etc.) may be needed for supporting the gimbal mechanism 621 that is coupled to at least one support member (e.g., 610) and an extendable or elongated member 631 that is coupled to the gimbal mechanism. A lower region and an upper region of the member 631 may move substantially within a region formed by the support members. In this manner, the system 600 only needs a small amount of space that is similar to the dimensions of the support members in order to provide an elevated height for capturing images. The support members are stable and resistant to many forces such as those typically encountered at a sporting event (e.g., basketball, baseball, football, volleyball, etc.) or outside even with windy or rainy weather conditions.

In one embodiment, the members 604 and 602 are coupled or attached to the chair 660. The chair includes a back 664, a seat 662, and legs 665-668. The legs 665 and 668 of the chair may be attached inside, outside, or coincidently with the members 604 and 602. Alternatively, the members 604 and 602 may be reduced in length to rest on top of the chair or reduced in length to attach to the chair back or legs.

In one embodiment, the elongated or extendable member 631 is coupled to a base 650 that can support an optional image capturing device 652 to capture images at an elevated height. The image capturing device 652 may be coupled wirelessly or with wires to an optional controller 660 that controls operations of the image capturing device 652. In an embodiment, the controller 660 includes a display and control options. The controller 660 is communicatively coupled to the image capturing device that can be attached, coupled, or located on the base 650 of the system. The wired or wireless connection 654 allows the controller to control operations of the image capturing device such as pan, tilt, camera zoom, etc.

The gimbal mechanism 621 includes members 620, 628, 629, 634, and 636. The gimbal mechanism is capable of providing movement of the extendable member and the image capturing device along a first axis and a second axis. A counterweight 640 (e.g., 5-20 pounds) can be attached to one end of the extendable member and the counterweight provides a self-righting force to the extendable member that tends to move the extendable member towards a vertical position with respect to a horizontal ground reference.

In an embodiment, a gimbal system includes support members and a gimbal mechanism coupled to at least one support member. The gimbal mechanism provides a range of motion along a first axis and along a second axis. An elongated member is coupled to the gimbal mechanism, which is capable of providing movement of the elongated member with a range of motion of three hundred and sixty degrees. A lower region of the elongated member that is below support members and also possibly an upper region of the elongated member that is above the support members may move substantially within a region formed by the support members. The support members may include a set of members that include four members with two of the members being coupled to a chair as illustrated in FIGS. 5 and 6. The support members may include a set of members that include at least three members with at least one of the members being coupled to a chair or a support platform.

In one embodiment, the support members include a circular support member that is substantially horizontal with respect to a ground reference as illustrated in FIG. 6. Each support member of the set may be coupled to the circular support member. The gimbal mechanism may include a circular member that is coupled to the circular support member and to the elongated member as illustrated in FIG. 6. The gimbal mechanism may include a member having curvature that is coupled to the circular support member and to the elongated member.

Figure 7:
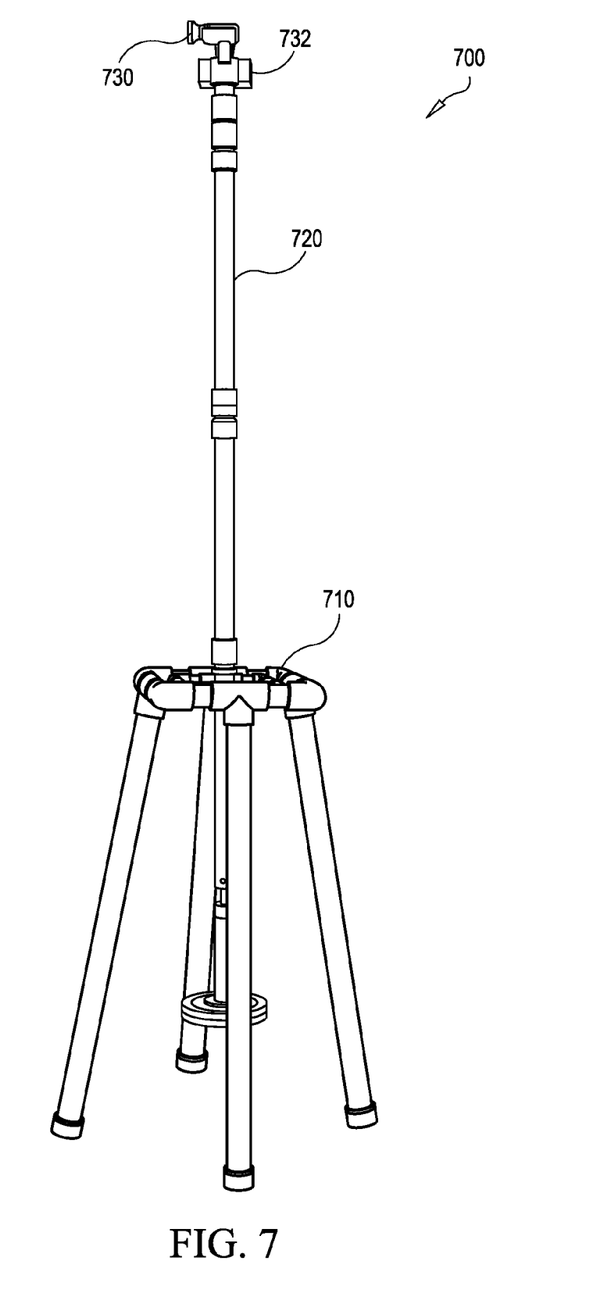
FIG. 7 illustrates a system having a gimbal mechanism and an elongated member in a substantially vertical position in accordance with one embodiment.

FIG. 7 illustrates an elevated video system 700 having a gimbal mechanism 710 and an elongated member 720 in a substantially vertical position in accordance with one embodiment. An image capturing device 730 is coupled to a base 732, which is coupled to the elongated member 720.

Figure 8:
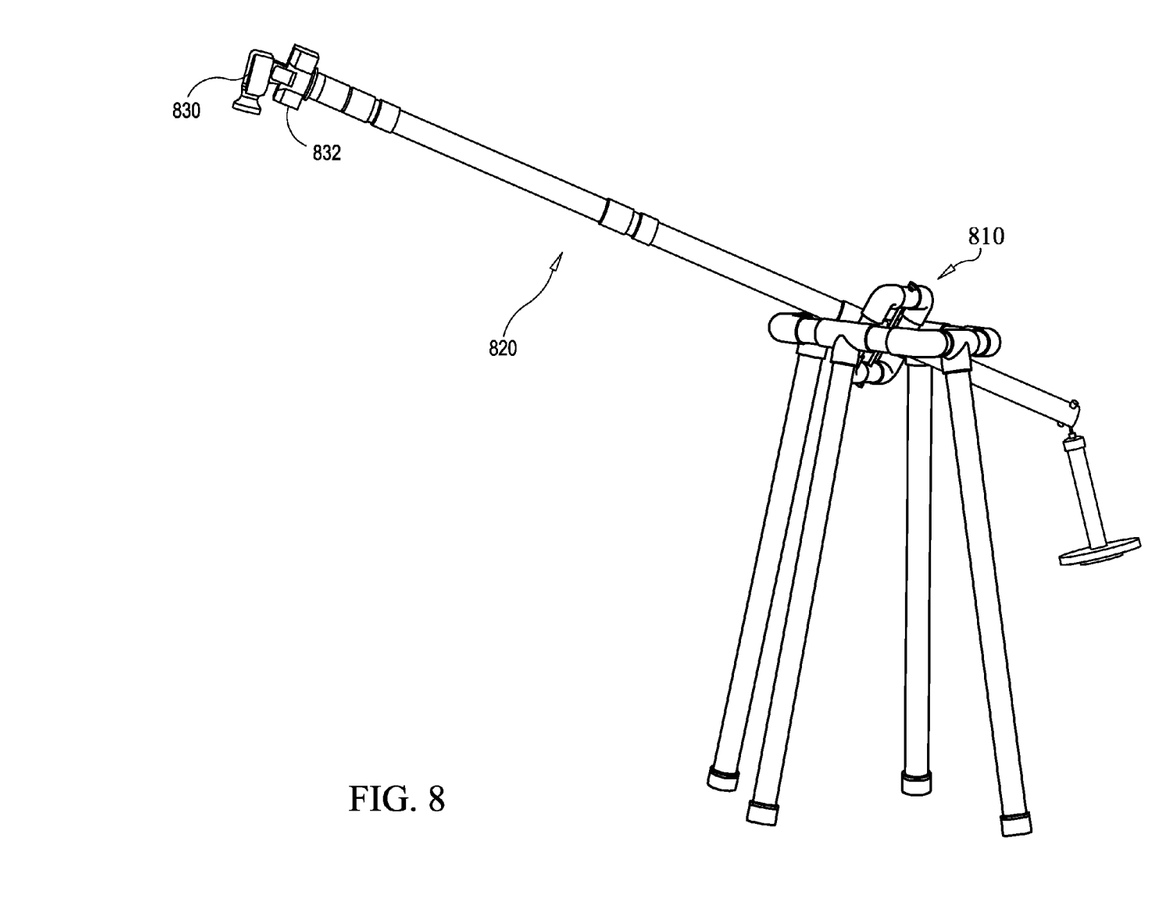
FIG. 8 illustrates a system having a gimbal mechanism and an elongated member in a substantially horizontal position in accordance with one embodiment.

FIG. 8 illustrates an elevated video system 800 having a gimbal mechanism 810 and an elongated member 820 in a substantially horizontal position in accordance with one embodiment. An image capturing device 830 is coupled to a base 832, which is coupled to the elongated member 820.

Figure 9:
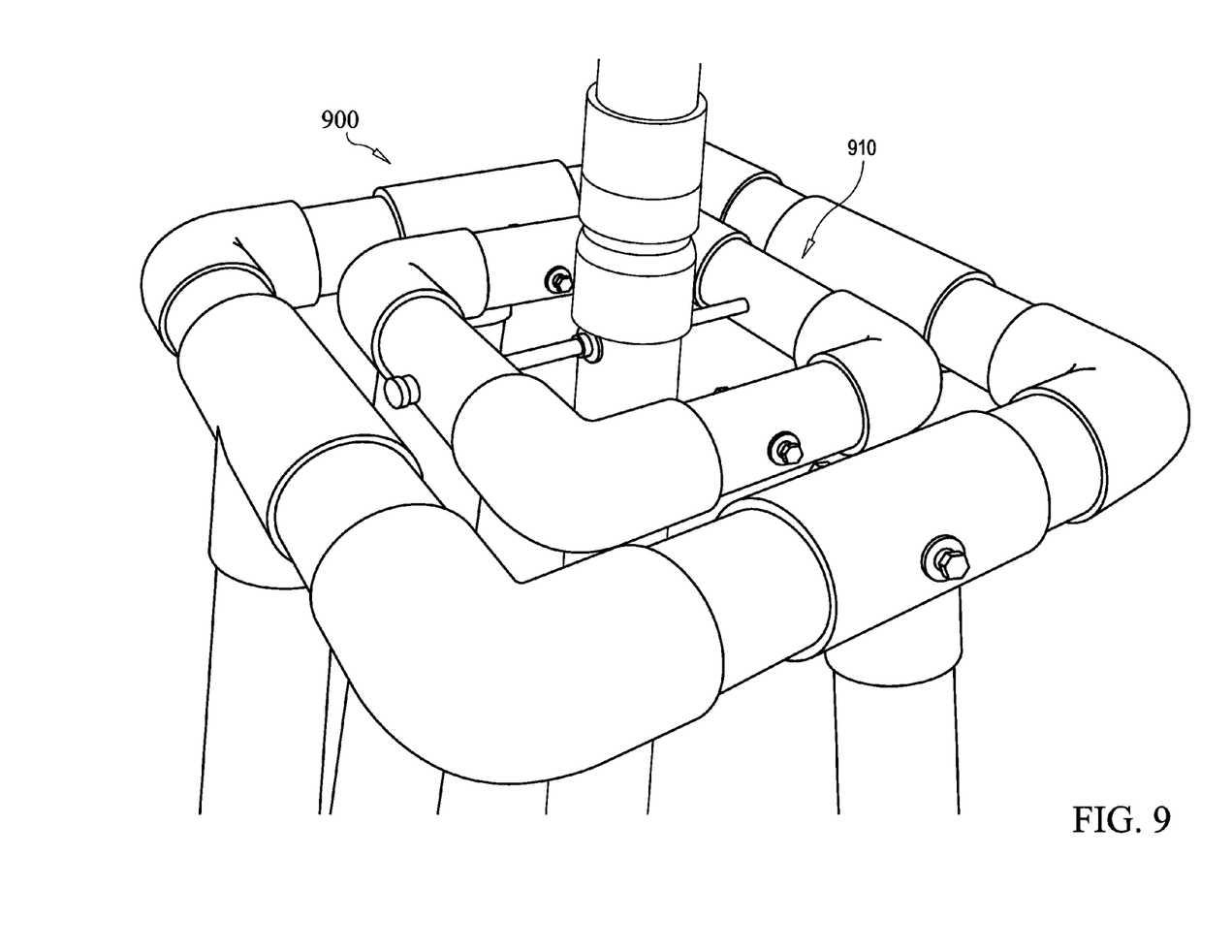
FIG. 9 illustrates a system having a gimbal mechanism in a first position in accordance with one embodiment.

FIG. 9 illustrates a system 900 having a gimbal mechanism 910 in a first position in accordance with one embodiment. The gimbal mechanism 910 may be in a substantially horizontal position, the first position, with respect to a ground reference.

Figure 10:
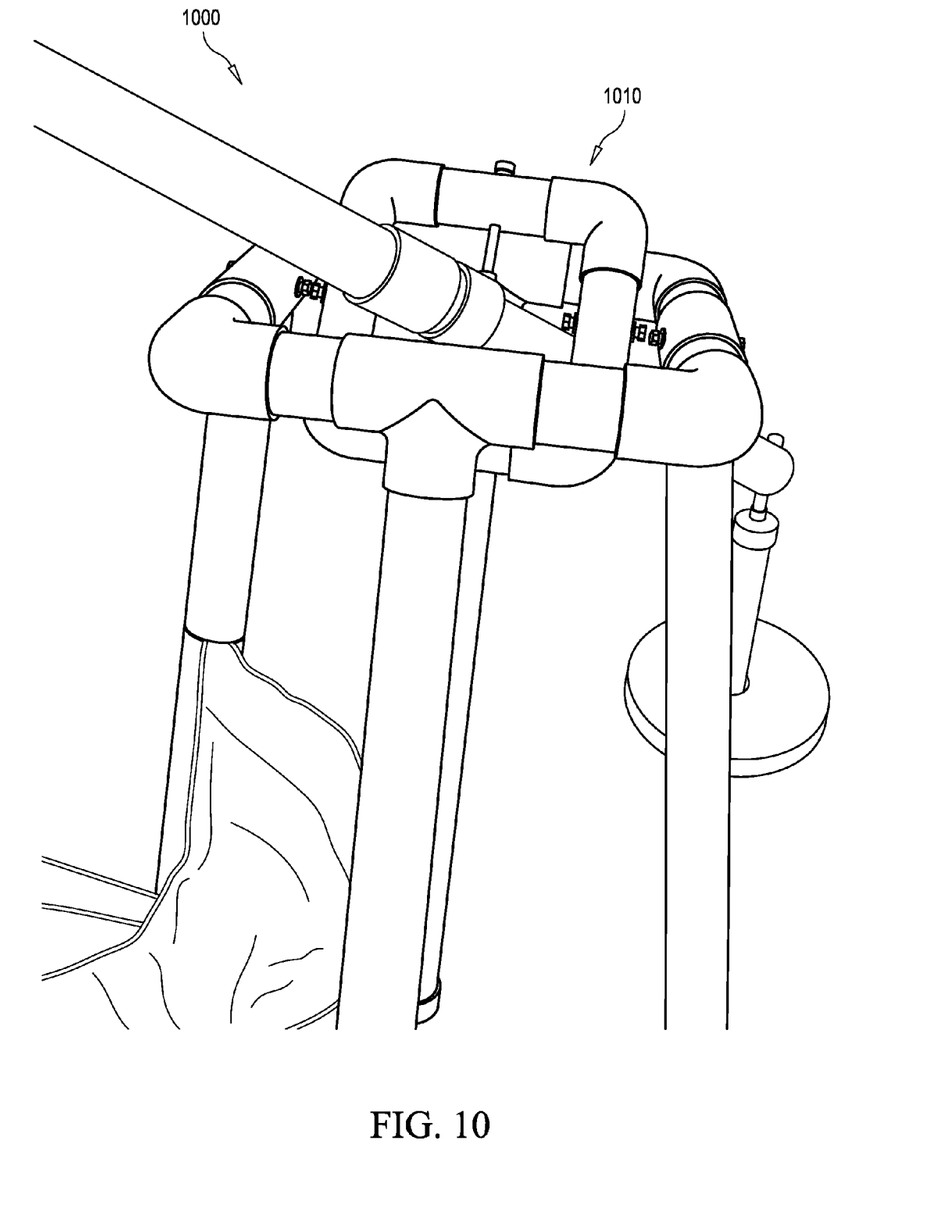
FIG. 10 illustrates a system having a gimbal mechanism in a second position in accordance with one embodiment.

FIG. 10 illustrates a system 1000 having a gimbal mechanism in a second position in accordance with one embodiment. The second position of the gimbal mechanism 1010 may be at a certain angle (e.g., 10-80 degrees) with respect to a ground reference.

Figure 11:
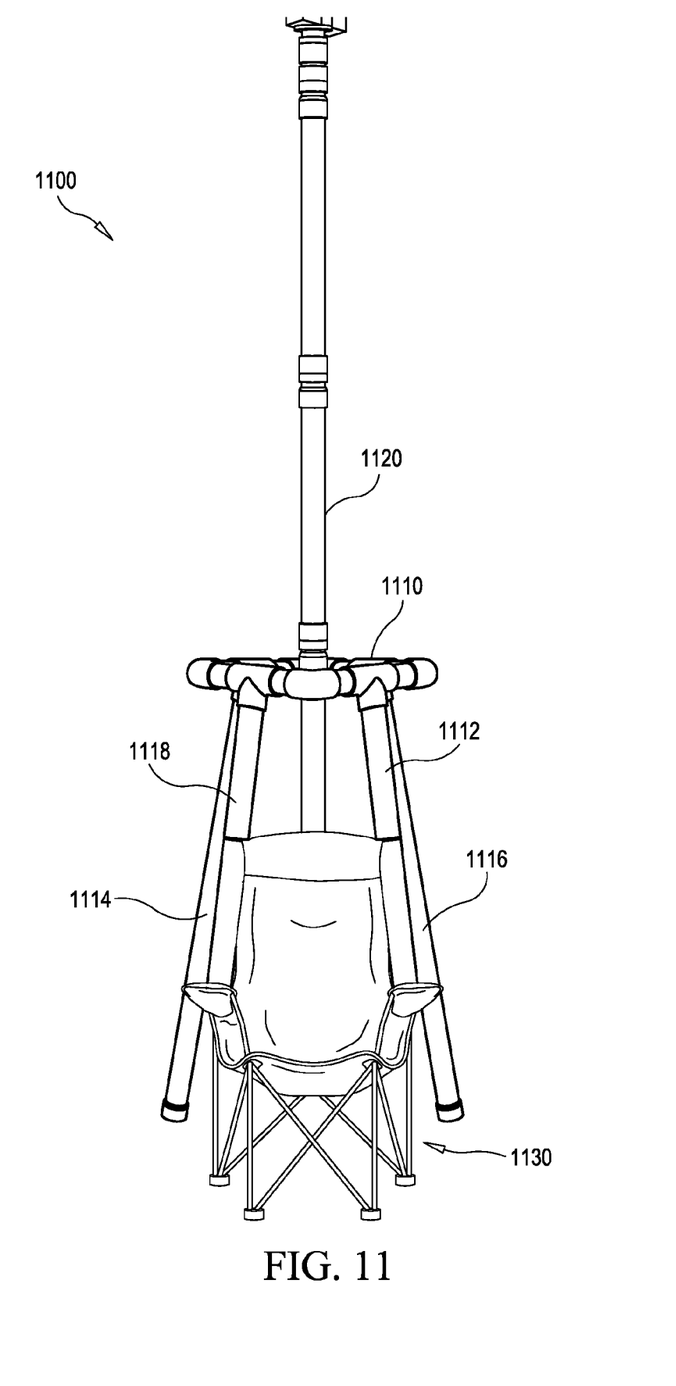
FIG. 11 illustrates a front view of a system having a gimbal mechanism that is coupled to a chair in accordance with one embodiment.

FIG. 11 illustrates a front view of a system 1100 having a gimbal mechanism 1110 that is coupled to a chair 1130 in accordance with one embodiment. The gimbal mechanism provides a range of motion for the elongated member 1120 as described herein. The chair 1130 is attached to two of the support members 1112 and 1118. These support members have been shortened in comparison to the support members 1116 and 1118.

Figure 12:
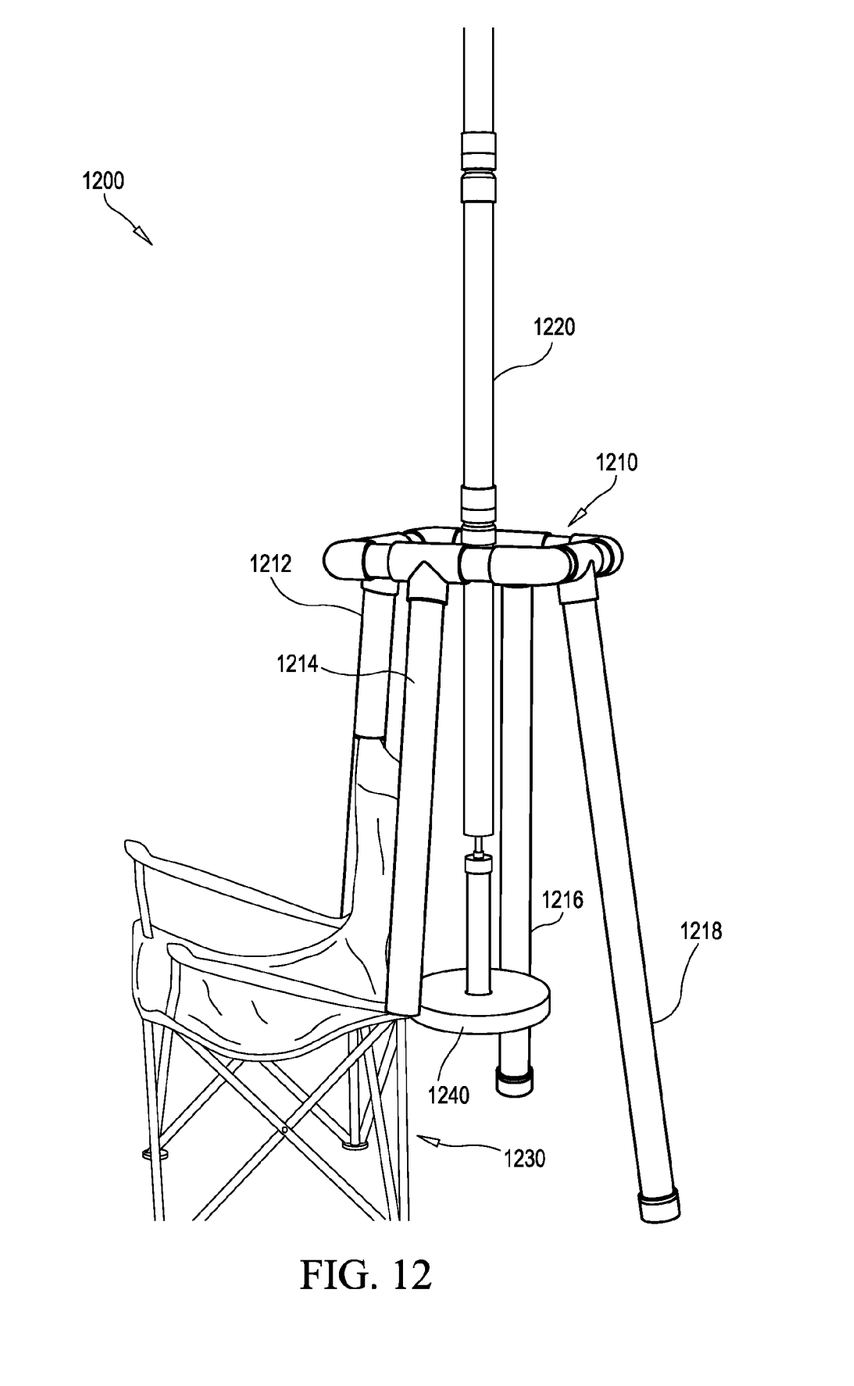
FIG. 12 illustrates a side view of a system having a gimbal mechanism that is coupled to a chair in accordance with one embodiment.

FIG. 12 illustrates a side view of a system having a gimbal mechanism that is coupled to a chair in accordance with one embodiment. The gimbal mechanism provides a range of motion for the elongated member 1220 as described herein. The chair 1230 is attached to two of the support members 1212 and 1214. These support members have been shortened in comparison to the support members 1216 and 1218. A counterweight 1240 provides a force that tends to keep the member 1220 near a vertical position.

Figure 13:
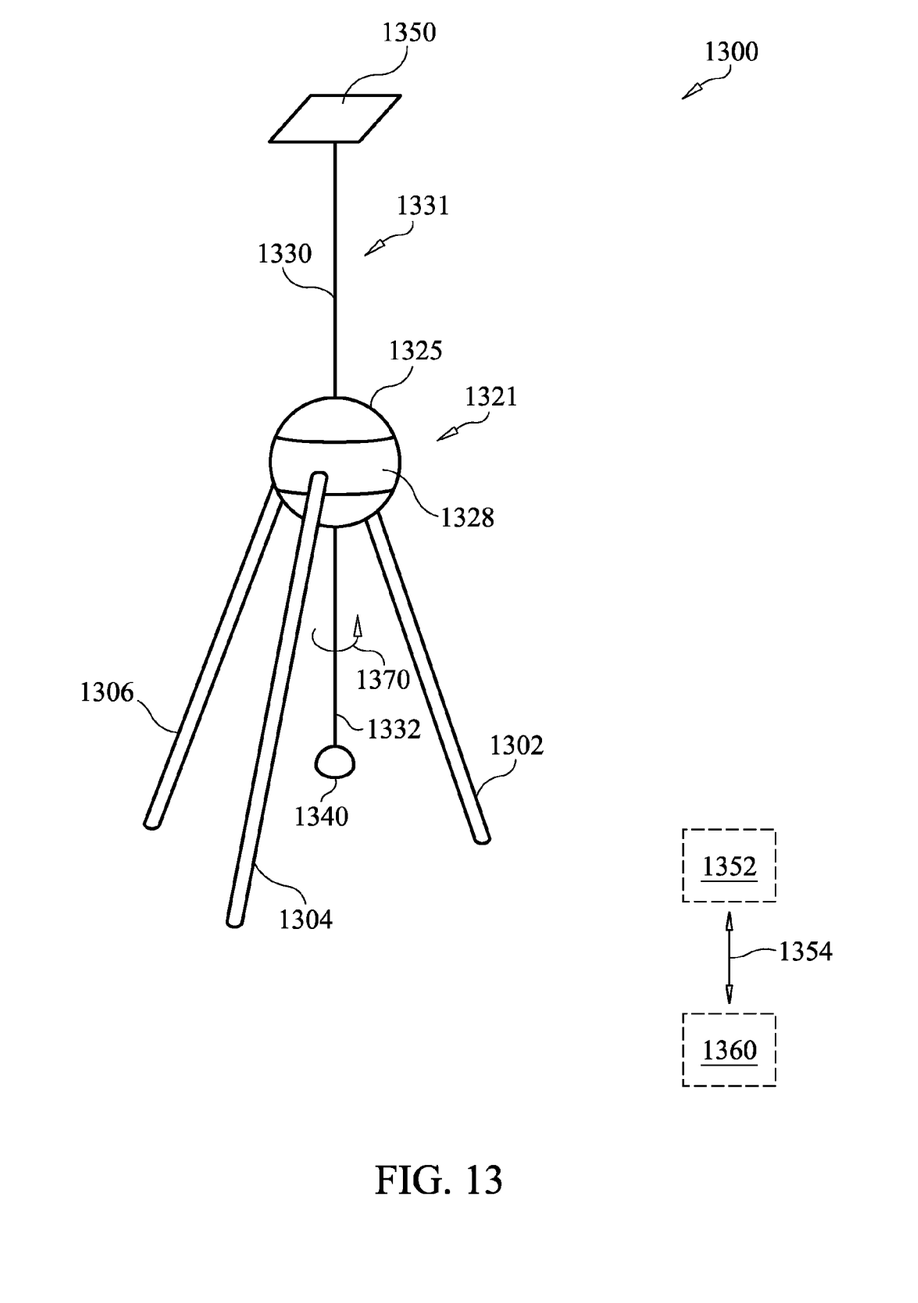
FIG. 13 illustrates a system having a central mechanism for movement of an elongated member in accordance with one embodiment.

FIG. 13 illustrates a system having a central mechanism for movement of an elongated member in accordance with one embodiment. The system may be used for capturing images or sequences of images (e.g., photos, digital stills, video) at an elevated height (e.g., 5-40 feet above a ground reference). The system 1300 includes support members 1302, 1304, 1306. The support members can rest on any relatively flat surface such as the ground, a floor, or even on uneven surfaces such as a platform, bleachers, etc for when one or more of the support members are reduced in length. Additional or fewer support members (e.g., elongated members, curved members, circular members, etc.) may be needed for supporting the central mechanism 1321 that is coupled to at least one support member and an extendable or elongated member 1331 that is coupled to the central mechanism. The member 1331 may include one or more members such as an upper member 1330 and a lower member 1332. The lower and upper members may be part of a single member that has multiple extendable members similar to a telescope. The lower member 1332 or lower region of the member 1331 may move substantially within a region formed by the support members. The upper member 1330 or an upper region of the member 1331 may also move substantially within a region formed by the support members. In this manner, the system 1300 only needs a small amount of space that is similar to the dimensions of the support members in order to provide an elevated height for capturing images. The support members are stable and resistant to many forces such as those typically encountered at a sporting event (e.g., basketball, baseball, football, volleyball, etc.) or outside even with windy or rainy weather conditions. The support members and components of the system may include plastic or metallic materials depending on a particular application. The system 1300 can be easily assembled as illustrated in FIG. 13 or disassembled into components that can be stored in a small compact area.

The extendable member may be extended to provide two or more lengths. In one embodiment, the extendable member 1331 is coupled to a base 1350 that can support an optional image capturing device 1352 to capture images at an elevated height. The image capturing device 1352 may be coupled wirelessly or with wires to an optional controller 1360 that controls operations of the image capturing device 1352. In an embodiment, the controller 1360 includes a display and control options. The controller 1360 is communicatively coupled to the image capturing device that can be attached, coupled, or located on the base 1350 of the system. The wired or wireless connection 1354 allows the controller to control operations of the image capturing device such as pan, tilt, camera zoom, etc.

The central mechanism 1321 may be a ball and socket pivot mechanism or other similar mechanism. A pivot mechanism may include a spherical member 1325 and a socket member 1328. The central (e.g., pivot) mechanism is capable of providing movement of the extendable member and the image capturing device with a range of motion of three hundred and sixty degrees in any direction. The rotation 1370 illustrates one exemplary range of motion. The member 1330 and the image capturing device may be elevated above the central mechanism in any direction or lowered to a level below the central mechanism if the lower member 1332 is elevated above the central mechanism. The central mechanism may be coupled to at least two support members (e.g., 1302, 1304, 1306). The central mechanism may also be coupled to the extendable member 1331. In an embodiment, the extendable member 1331 is replaced with an elongated member having a fixed length.

A counterweight 1340 (e.g., 5-30 pounds) can be attached to one end of the extendable member and the counterweight provides a self-righting force to the extendable member that tends to move the extendable member towards a vertical position with respect to a horizontal ground reference.

In one embodiment, a system includes a plurality of support members and a central pivot mechanism coupled to at least one support member. An elongated member is coupled to the pivot mechanism. The pivot mechanism is capable of providing movement of the elongated member with a range of motion of three hundred and sixty degrees. A lower region of the elongated member moves substantially within a region formed by the support members. The pivot mechanism may include a spherical member and a socket member.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An elevated system, comprising:
a plurality of support members;
a gimbal mechanism coupled to at least one support member; and
an elongated member being coupled to the gimbal mechanism, wherein the gimbal mechanism is capable of providing movement of the elongated member and an associated image capturing device along a first axis and a second axis, wherein the support members include a first set of members comprising four substantially vertical members that rest on a relatively flat surface when the elevated system is in an assembled condition, wherein the support members include a second set of curved members comprising four substantially horizontal members that are coupled to each other and the first set of members when the elevated system is in the assembled condition, wherein the second set of curved members in combination form a circle that surrounds the gimbal mechanism.

2. The elevated system of claim 1, wherein each support member of the first set is coupled to a corresponding support member of the second set.

3. The elevated system of claim 1, wherein the first axis of the gimbal mechanism is perpendicular to the second axis of the gimbal mechanism such that the gimbal mechanism provides a range of motion of three hundred and sixty degrees, wherein the gimbal mechanism includes a circular member that is coupled to the first axis and the second axis.

4. The elevated system of claim 1, further comprising a counterweight attached to one end of the elongated member to provide a self-righting force to the elongated member.

5. The elevated system of claim 3, wherein the gimbal mechanism is coupled to at least two support members of the second set of support members.

6. A system, comprising:
a plurality of support members to rest on any relatively flat surface when the system is in an assembled condition;
a pivot mechanism coupled to the plurality of support members which support the pivot mechanism; and
an elongated member being coupled to the pivot mechanism, the pivot mechanism to provide movement of the elongated member with a range of motion of three hundred and sixty degrees, wherein a lower region of the elongated member moves substantially within a region formed by the support members, wherein the pivot mechanism includes a spherical member shaped like a ball and a socket member, wherein the elongated member is designed to support and move an image capturing device at an elevated height to capture images when the system is in the assembled condition.

7. The system of claim 6, wherein the support members include a set of members comprising four members with two of the members being coupled to a chair and at least one other member having a different length than the two members that are coupled to the chair, wherein the at least one other member rests on any relatively flat surface when the system is in an assembled condition.

8. The system of claim 6, wherein the support members include a circular support member that is substantially horizontal with respect to a ground reference when the system is in the assembled condition.

9. The system of claim 7, wherein each support member of the set is coupled to the circular support member.

10. The system of claim 8, wherein the mechanism comprises a gimbal mechanism that includes a member having curvature that is coupled to the circular support member and to the elongated member.

11. The system of claim 10, wherein the support members include a set of members comprising three members with at least one of the members being coupled to a chair or a separate support platform.

12. A system, comprising:
a plurality of support members;
a mechanism coupled to at least one support member, the mechanism to provide a range of motion; and
an extendable member being coupled to the mechanism such that the mechanism is capable of providing movement of the extendable member and an associated image capturing device that is supported by the extendable member with a range of motion of three hundred and sixty degrees, wherein the support members include a set of members comprising three members with at least one of the members being coupled to a chair that supports the at least one member and at least one different member resting on a relatively flat surface when the system is in an assembled condition, wherein the support members to support the mechanism, the extendable member, and the image capturing device.

13. The system of claim 12, wherein the support members include a set of members comprising four members, wherein the at least one member that is coupled to the chair has a different length than the at least one different member that rests on a relatively flat surface when the system is in the assembled condition.

14. The system of claim 12, wherein the support members include a support member having curvature that is substantially horizontal with respect to a ground reference when the system is in the assembled condition.

15. The system of claim 12, wherein the support members in combination with the chair to support the mechanism and the extendable member.

16. The system of claim 13, wherein the support members include another set of members comprising four substantially horizontal members that are coupled to each other when the system is in an assembled condition.

17. The system of claim 14, wherein a lower region of the extendable member is located substantially below the support member having curvature and within the set of members that comprise at least three members.

* * * * *